(12) United States Patent
Kawahara et al.

(10) Patent No.: US 11,475,541 B2
(45) Date of Patent: Oct. 18, 2022

(54) IMAGE RECOGNITION APPARATUS

(71) Applicant: KABUSHIKI KAISHA TOSHIBA, Tokyo (JP)

(72) Inventors: Tomokazu Kawahara, Yokohama Kanagawa (JP); Tomoyuki Shibata, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 57 days.

(21) Appl. No.: 16/556,762

(22) Filed: Aug. 30, 2019

(65) Prior Publication Data
US 2020/0294197 A1 Sep. 17, 2020

(30) Foreign Application Priority Data
Mar. 15, 2019 (JP) .............................. JP2019-048218

(51) Int. Cl.
*G06T 3/60* (2006.01)
*G06T 7/33* (2017.01)
*G06T 7/70* (2017.01)
*G06T 7/11* (2017.01)

(52) U.S. Cl.
CPC ............. *G06T 3/60* (2013.01); *G06T 7/11* (2017.01); *G06T 7/33* (2017.01); *G06T 7/70* (2017.01); *G06T 2207/20212* (2013.01); *G06T 2207/30196* (2013.01)

(58) Field of Classification Search
CPC .... G06T 3/60; G06T 7/33; G06T 7/70; G06T 7/11; G06T 2207/30196; G06T 2207/20212; G06K 9/2054; G06K 9/00771
See application file for complete search history.

(56) References Cited

U.S. PATENT DOCUMENTS 10,445,566 B2 * 10/2019 Sashida .............. G06K 9/00342
10,909,718 B2 * 2/2021 Yu .............................. G06T 7/73
(Continued)

FOREIGN PATENT DOCUMENTS

JP 2008146132 A 6/2008
JP 2008287704 A 11/2008
(Continued)

OTHER PUBLICATIONS

Girshick, "Fast R-CNN", Computer Vision and Pattern Recognition ( cs. CV) asXive:1504.08083[cs.CV], 2015, 1440-1448.
(Continued)

*Primary Examiner* — Wesley J Tucker
(74) *Attorney, Agent, or Firm* — Holtz, Holtz & Volek PC

(57) ABSTRACT

An image recognition apparatus includes circuitry. The circuitry is configured to input an image of an object captured by a camera. The circuitry is further configured to divide, based on a predetermined positioning point, the image into a plurality of regions, set a process region that includes the respective divided region, and set a rotation of the respective process region so that a positional relationship between up and down of the object in the respective process region matches up. The circuitry is further configured to perform the rotation to the image corresponding to the respective process region and perform a recognition process to the image after rotation.

18 Claims, 16 Drawing Sheets

(56) References Cited

U.S. PATENT DOCUMENTS

| | | | |
|---|---|---|---|
| 2012/0274782 A1* | 11/2012 | Kitaguchi | G06V 10/147 |
| | | | 348/169 |
| 2014/0193034 A1 | 7/2014 | Oami et al. | |
| 2014/0341430 A1* | 11/2014 | Ryu | G06T 3/60 |
| | | | 382/103 |
| 2018/0258616 A1* | 9/2018 | Kiyota | G06T 1/20 |
| 2018/0285634 A1* | 10/2018 | Varadarajan | G06K 9/6274 |
| 2018/0343435 A1* | 11/2018 | Mizuno | G06T 3/0018 |
| 2019/0220685 A1* | 7/2019 | Uchiyama | G06K 9/00362 |
| 2019/0378290 A1* | 12/2019 | Yamaura | G06K 9/00771 |

FOREIGN PATENT DOCUMENTS

| | | |
|---|---|---|
| JP | 2012230546 A | 11/2012 |
| WO | 2013001941 A1 | 1/2013 |

OTHER PUBLICATIONS

Liu, et al., "SSD: Single Shot MultiBox Detector", Computer Vision and Pattern Recognition (cs. CV) ARxIV:1 512.02325 [CS.cv], 2016.

Redmon, et al., "You Only Look Once: Unified, Real-Time Object Detection", IEEE Conference on Computer Vision and Pattern Recognition (CVPR), 2016.

Watanabe, et al., "Co-occurrence Histograms of Oriented Gradients for Human Detection", Information Processing Society of Japan (IPSJ) Transactions on Computer Vision and Applications, Mar. 2010, vol. 2, pp. 39-47.

Barman, et al., "Person Re-identification Using Overhead View Fisheye Lens Cameras", Industrial Property Cooperation Center. Downloaded on Aug. 27, 2021 from IEEE Xplore.

* cited by examiner

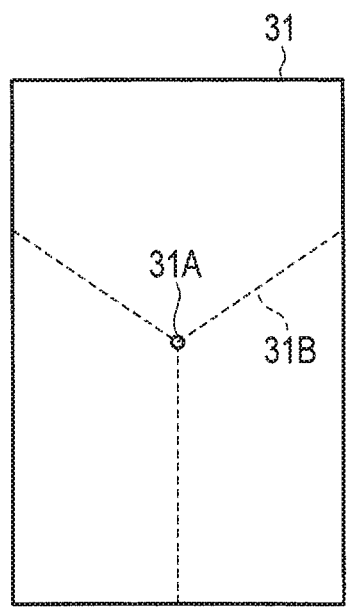
F I G. 3A
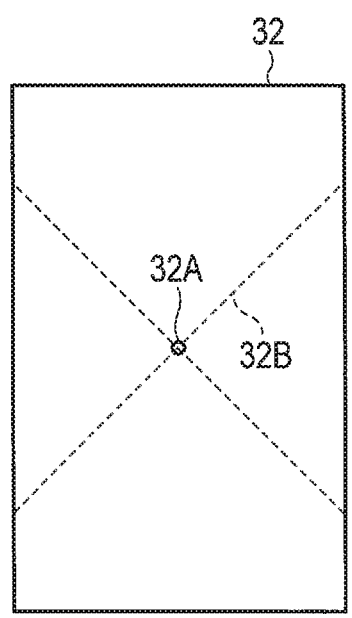
F I G. 3B

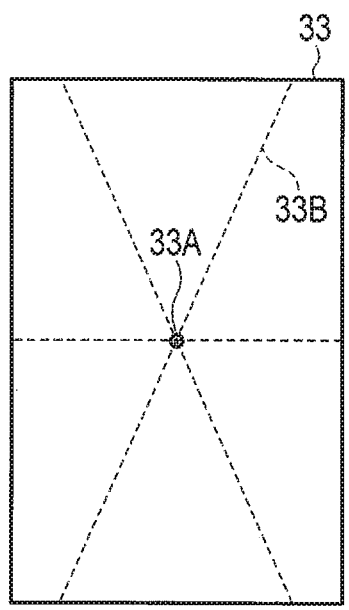
F I G. 3C
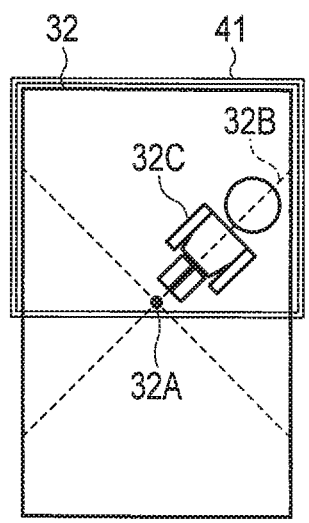
F I G. 4A

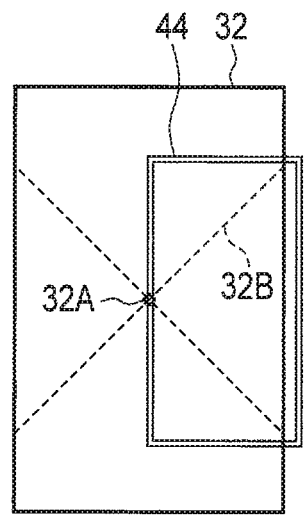
F I G. 4D
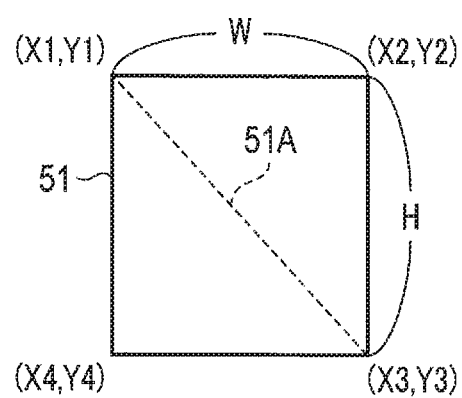
F I G. 5A

| Top left X | Top left Y | Bottom right X | Bottom right Y |
|---|---|---|---|
| X1 | Y1 | X3 | Y3 |

F I G. 5B

| Top left X | Top left Y | Width | Height |
|---|---|---|---|
| X1 | Y1 | W | H |

F I G. 5C

| Top left X | Top left Y | Top right X | Top right Y | Bottom right X | Bottom right Y | Bottom left XX | Bottom left XY |
|---|---|---|---|---|---|---|---|
| X1 | Y1 | X2 | Y2 | X3 | Y3 | X4 | Y4 |

F I G. 5D

IMAGE RECOGNITION APPARATUS

CROSS-REFERENCE TO RELATED APPLICATIONS

This application is based on claims and benefits from priority from Patent Application No. 2019-48218, filed Mar. 15, 2019, the entire contents of which are incorporated herein by reference.

FIELD

Embodiments described herein relate generally to an image recognition apparatus.

BACKGROUND

Previously, image recognition apparatuses have been known that recognize the position of objects in camera-captured images. In recent years, however, image recognition apparatuses have been proposed that use dictionaries and parameters learning from large quantities of images and position data on objects in the images. These objects may have a positional relationship which is either between up and down or between left and right.

Whenever the positional relationship between up and down of an object to be recognized differs from a learned positional relationship of the object, the aforementioned image recognition apparatuses are unable to use preexisting position data.

BRIEF DESCRIPTION OF THE DRAWINGS

FIG. 3A illustrates an example of an image division.

FIG. 3B illustrates an example of an image division.

FIG. 3C illustrates an example of an image division.

FIG. 4A illustrates an example of a divided image in which a process region of a rectangle has been set.

FIG. 4D illustrates an example of a divided image in which a process region of a rectangle has been set, FIG. 5A illustrates data of a rectangle as a process region.

FIG. 5B illustrates an example of a data structure of the rectangle.

FIG. 5C illustrates an example of a data structure of the rectangle.

FIG. 5D illustrates an example of a data structure of the rectangle.

DETAILED DESCRIPTION

According to one embodiment, an image recognition apparatus includes circuitry configured to input an image of an object captured by a camera, divide, based on a predetermined positioning point, the image into a plurality of regions, set a process region that includes the respective divided region, set a rotation of the respective process region so that a positional relationship between up and down of the object in the respective process region matches up, perform the rotation to the image corresponding to the respective process region, and perform a recognition process to the image after rotation.

Hereinafter, embodiments will be described with reference to accompanying drawings. The positional relationship between a person's head and feet in a footage or an image shot facing obliquely downward from a high altitude with, for example, a security camera or a digital camera is usually so that the head is up and the feet are down. The same is therefore true of the positional relationship between a person's head and feet in an image for learning human detection, namely that the head is up and the feet are down.

On the other hand, footage surveillance systems may use cameras installed directly downward from high altitudes such as to ceilings or pillars of buildings, for, for example, the reason that persons in the footages will be less prone to overlap with each other. Cameras installed in this way will hereinafter be referred to as "ceiling cameras".

The positional relationship between a person's head and feet in a ceiling camera image is such that the feet are inside and the head is outside of a circle at the center of which the person's feet are hidden by the person's head. Therefore, a person in the lower part of the footage has his/her head down and feet up, meaning the positional relationship is opposite to what is normal. Thus, a human detection using dictionaries or deep model parameters of feature amounts learned from regular images is incapable of detecting persons in regions where the head is not up and the feet are not down.

First Embodiment

In a first embodiment, the image recognition apparatus performs a recognition process of images captured by a ceiling camera using dictionaries or deep models of amounts learned from preexisting images. The recognition process will be described using an example of a process for detecting the position of a person in a footage. However, the object to be detected may be other than a person, for example, a car, a box, product, a cart, etc. Likewise, the recognition process may be other than detection, for example, classification of a person's name or ID, a car model of a vehicle, a product type, etc.

Similarly, the capturing means is not limited to ceiling cameras, meaning that objects may be captured using a drone or another air vehicle that captures objects from a high altitude.

Figure 1:
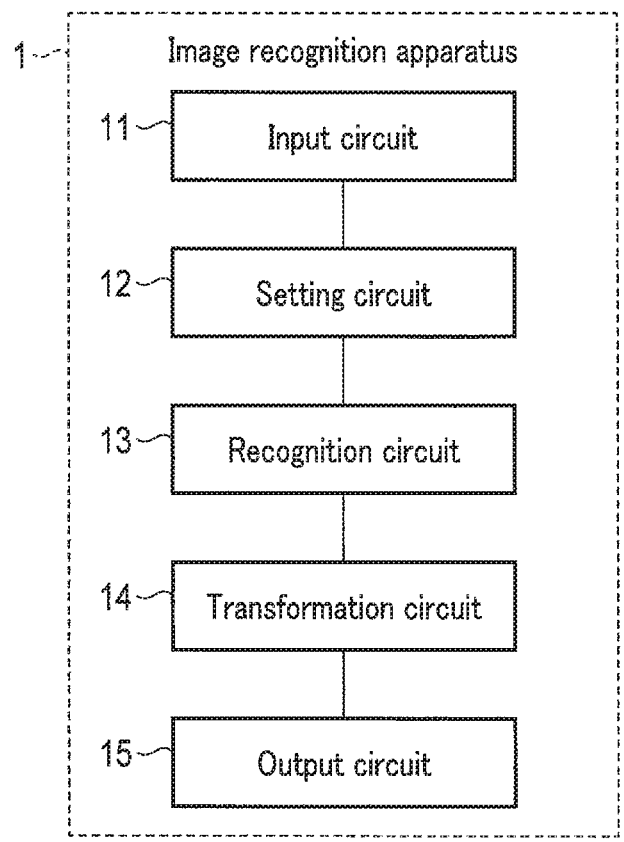
FIG. 1 is a block view illustrating the configuration of an image recognition apparatus according to a first embodiment.

FIG. 1 is a block view illustrating an image recognition apparatus 1 according to the present embodiment. The image recognition apparatus 1 includes an input circuit 11, a setting circuit 12, a recognition circuit 13, a conversion circuit 14, and an output circuit 15.

The input circuit 11 is for inputting the camera-captured images. Although hereinafter the scenario will be described of an input image captured by a camera installed facing downward from a high location, in which the person's feet are hidden by his/her head, the process described in this embodiment can be performed even if the feet of the arbitrarily located person in the image is not covered by the person's head.

Figure 2A:
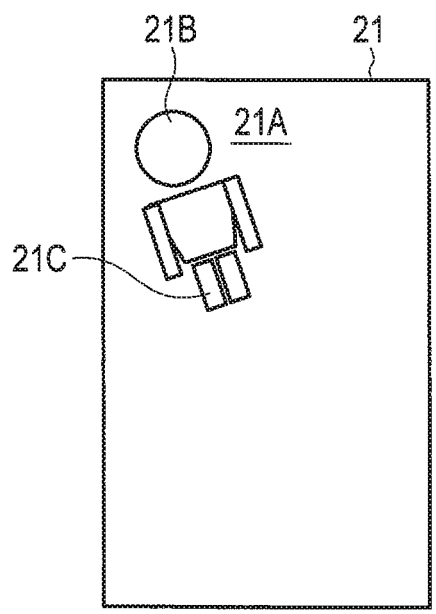
FIG. 2A illustrates an example of an image captured by a ceiling camera facing directly downward.
Figure 2B:
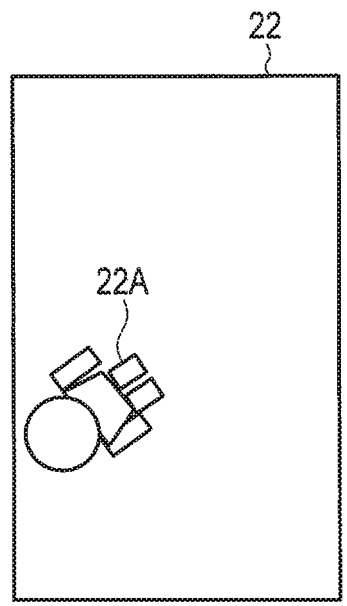
FIG. 2B illustrates an example of an image captured by a ceiling camera facing directly downward.
Figure 2C:
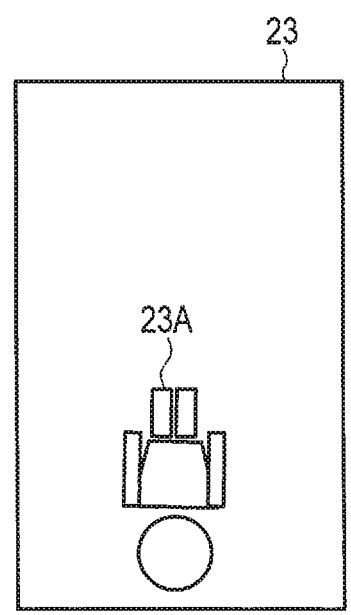
FIG. 2C illustrates an example of an image captured by a ceiling camera facing directly downward.

FIGS. 2A to 2C are views illustrating examples of images captured by a ceiling camera facing directly downward. FIG. 2A illustrates a person 21A in the top left of image 21. FIG. 2B illustrates a person 22A in the bottom left of image 22. FIG. 20 illustrates t a person 23A in the bottom of image 23. In FIG. 2A, 21B indicates the head of the person 21A, while 21C indicates the feet of the person 21A.

As the ceiling camera facing directly downward captures the person at the center of the image, the person's head is hiding his/her feet. Thus, in, for example, FIG. 2A, the feet 21C of the person 21A are near the center of the image 21, whereas the head 21B is farther away from the center.

The setting circuit 12 divides the input image using rays (segments extending radially from the center of the image) starting at a predetermined positioning point as a starting point (division process); sets process regions that include the respective divided regions (region setting process); and sets rotations for the set process regions (rotation setting process).

Hereinafter, each of the above processes will be described in detail.

FIGS. 3A to 3C show examples of image divisions. FIG. 3A illustrates image division of image 31 into three equal angles. FIG. 3B illustrates image division of image 32 into four equal angles. FIG. 3C illustrates image division of image 33 into six equal angles.

As shown in, for example, FIG. 3A, the setting circuit 12 divides the image 31 into three parts with rays 31B starting from the predetermined positioning point 31A as the starting point in the image 31, the three parts having the same angle around the predetermined positioning point 31A. Similarly, as shown in FIG. 3B, the setting circuit 12 divides the image 32 into four parts the same angle with rays 32B starting from the predetermined positioning point 32A as the starting point in the image 32, and likewise, the setting circuit 12 divides, as shown in FIG. 3C, the image 33 into six parts having the same angle with rays 33B starting from the predetermined positioning point 33A as the starting point in the image 33.

The number of divided image regions may be different from this, and equal angle division is not a necessity, even though the regions in the examples of FIGS. 3A-3C have been equally divided. Straight lines may be used that pass the predetermined positioning point. In this case, each straight line is regarded as two rays that extend in opposite directions from the predetermined positioning point as the starting point.

The predetermined positioning point is the point at which the person's feet in the image are hidden by his/her head. If there are multiple such points, any thereof may be selected. For example, as the head and feet have a reach, the head will hide the feet, even if the person whose head is hiding the feet moves a little. Therefore, the location after movement is also a potential predetermined positioning point. By another determination method, images may be created where the respective process region (to be described further below) is rotated with respect to a temporarily determined positioning point, and then displayed, so that a user can visually determine the positioning point with reference to the location of the person's head and feet in the created images.

Figure 4B:
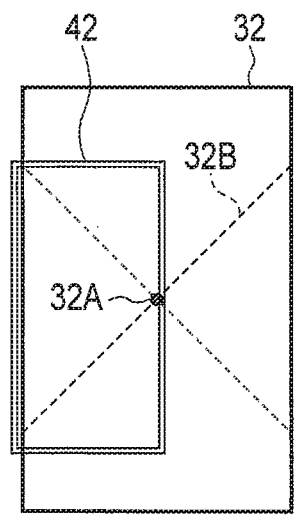
FIG. 4B illustrates an example of a divided image in which a process region of a rectangle has been set.
Figure 4C:
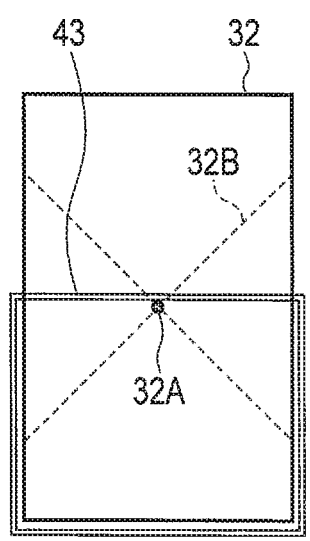
FIG. 4C illustrates an example of a divided image in which a process region of a rectangle has been set.

Next, the setting circuit 12 performs a region setting process for configuring process regions that include respective corresponding divided regions of the image. FIGS. 4A-4D illustrate examples of configuring process regions of a rectangle in a divided image, and how the rectangle of each process region in the image 32 divided into four parts shown in FIG. 3B is set. FIG. 4A illustrates a process region 41 set in the top part of the image 32. FIG. 4B illustrates a process region 42 set in the left part of the image 32. FIG. 4C illustrates a process region 43 set in the bottom part of the image 32. FIG. 4D illustrates a process region 44 set in the right part of the image 32.

Here, for example, FIG. 4A illustrates a person 32C placed at a division boundary (for example, ray 32B) and divided into two parts, so that it could be that neither part is detected as the person 32C. For this reason, it is necessary to set the process region 41 including the divided regions so that the person 32C on the boundary line is fully included.

Note that, by another process region setting method, a region with a shortest distance to the boundary line in the image of N pixels or less may be adopted. The value of N may be, for example, the radius of the circle that includes the person captured by the camera. Also, by a setting method other than that of a rectangle, the process region may be set using a polygon.

The setting circuit 12 stores, as vertex coordinates of the rectangle's diagonal, in a non-volatile memory, data relating to the aforementioned process region of the rectangle. Here, a rectangle 51 is assumed, as shown in FIG. 5A. The rectangle 51 has a height H, a width W, a diagonal 51A, and respective corner coordinates (X1, Y1), (X2, Y2), (X3, Y3), (X4, Y4).

FIG. 5B illustrates the stored coordinates (X1, Y1), (X3, Y3) of the vertexes of the diagonal line 51A in the rectangle 51, called data structure 52. FIG. 5C illustrates another form of data structure 53, wherein the setting circuit 12 stores the coordinates (X1, Y1) of the top left of the rectangle 51, the width W, and the height H, in the non-volatile memory. FIG. 5D illustrates yet another form of data structure 54, wherein the setting circuit 12 stores the four corner coordinates (X1, Y1), (X2, Y2), (X3, Y3), (X4, Y4) of the rectangle 51, in the non-volatile memory.

Figures 6A, 6B:
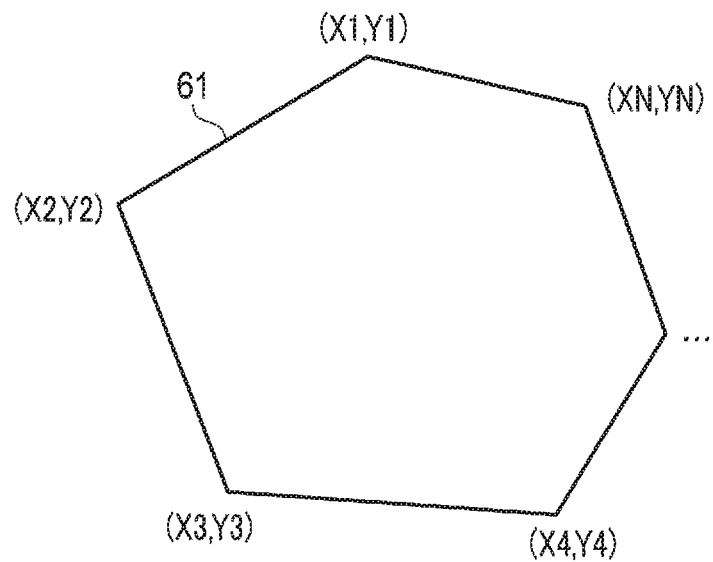
FIG. 6A illustrates data of a polygon as a process region.
FIG. 6B illustrates an example of a data structure of the polygon.

FIGS. 6A and 6B illustrate modifications of the process region. FIG. 6A illustrates the process region of a polygon 61, which, at the respective vertexes, has the coordinates (X1, Y1), (X2, Y2), (X3, Y3), (X4, Y4), . . . , (XN, YN). FIG. 6B illustrates data structure 62 that stores data on such polygon 61.

Next, the setting circuit 12 performs a setting of the angle of rotation (rotation setting process) for the process regions. Specifically, the angle of rotation is set such that the positional relationship between up and down of the person in the respective process region matches up, meaning that the head of the person in the respective process region is up and the feet are down. In this case, with the angle to be set, the bisector bisecting the angle between the two boundary lines that divide the image region becomes vertical.

The angle of rotation may be set within a predetermined range. It is also possible to adopt an angle that causes the straight line connecting the head and the feet of the person in the image, instead of the bisector of the boundary lines, to become vertical or to fall within a predetermined range. The angle of rotation may also be set based on the result of human detection on the image subjected to the process region rotation. Also, images may be created and displayed where rotation has been performed of a respective process region (to be described further below), and the angle may be set visually by the user looking at the position of the person's head and feet in the images.

Next, the recognition circuit 13 performs rotation of the respective process region before performing a recognition process (here, a human detection process). First, the method of performing rotation of the respective process region will be described. Here, by using the data of the process region set by the setting circuit 12, the recognition circuit 13 determines based on each pixel in an input image whether or not the input image is included in the set process region.

It is assumed that the process region data is given by, for example, coordinates (X1, Y1, X3, Y3) in the top left and the bottom right of the rectangle 51 shown in FIG. 5A. Where the X-coordinate of the input image pixel is not less than X1 which is the top left X-coordinate of the rectangle 51, and the X-coordinate is smaller than X3 which is the bottom right X-coordinate, and further, where the Y-coordinate of the pixel is not less than Y1 which is the top left Y-coordinate of the rectangle 51, and the Y-coordinate is smaller than Y3 which is the bottom right Y-coordinate, the recognition circuit 13 determines that the pixel is included in the process region of the rectangle 51, and that elsewise it are not included therein. Next, the coordinates of the pixels determined as being included are calculated, assuming that their positions have been subjected to a rotation for the process region. Pixel values are arranged at the coordinates after the rotation, and the human detection process is applied.

When arranging the pixel values at the coordinates after the rotation, the pixel values may be arranged in the memory, or the arranged pixel values may be used to create an image. The recognition circuit 13 may create a plurality of image corresponding to the process regions. Alternatively, the recognition circuit 13 may create a single image by connecting a plurality of image corresponding to the process regions. Even in the case of a plurality of image or a connected single image, detection processing is performed thereon.

The result of detection is obtained by a rectangle surrounding a person. An example of rectangular coordinate data has the data structure 52, 53, or 54 shown in, for example, FIGS. 5B-5D. As another method of expressing the result of detection, a circle surrounding a person, a pixel mask of the person, coordinates of pixel at the center position of the person, or the like may be used.

The detection target may be any object other than a person. For example, a car, a box, a product, a cart, etc. may be used. The recognition process may be other than detection, for example, the classification of a person's name or ID, the car models of a vehicle, a product type, etc.

Next, the conversion circuit 14 performs, to the recognition result of the respective process region, a process that includes rotation opposite to the rotation by the angle for the set process region, so that the recognition result is converted into a result for the input image. AS the conversion method, after having performed the rotation opposite to the rotation by the angle for the process region, the conversion circuit 14 adds the difference between the coordinates of the point in the process region and the point in the corresponding input image to the coordinates in the top left and bottom right of the rectangle surrounding the detected person. In this manner, it is possible to obtain the coordinates in the top left and bottom right of the rectangle in the input image from the result of detection of the coordinates in the top left and bottom right of the rectangle.

Next, the output circuit 15 outputs the conversion result of the process.

Figure 7:
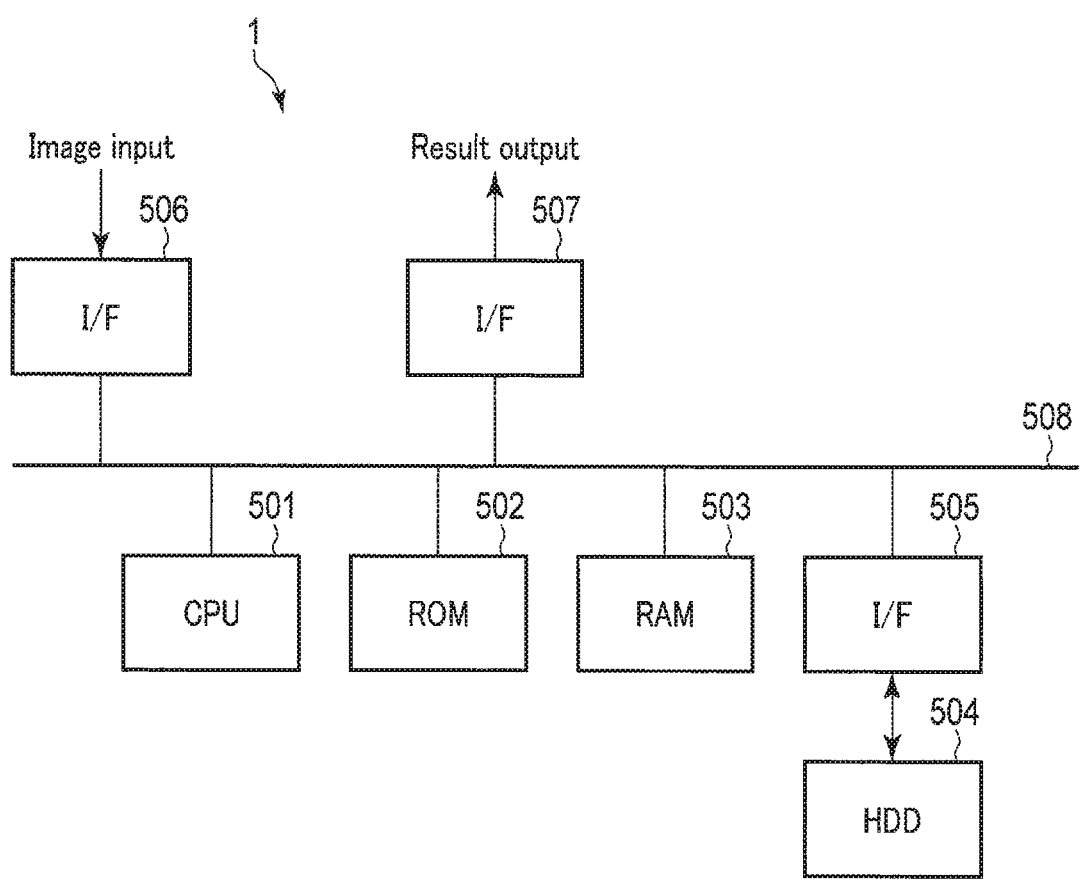
FIG. 7 is a block diagram illustrating an example of the hardware configuration of the image recognition apparatus in case where the apparatus is implemented by a computer.

FIG. 7 is a block diagram illustrating an example of the hardware configuration of the image recognition apparatus 1 in case where the apparatus 1 is implemented by a computer. As shown in FIG. 7, the image recognition apparatus 1 comprises: a CPU 501 being a computer processor; a ROM 502 for storing a detection program for detecting objects such as persons from input images; a RAM 503; an HDD 504 for storing dictionary data for detection; an I/F 505 being an interface with the HDD 504; an I/F 506 being an interface for data input; an I/F 507 being an interface for result output; and a bus 508, wherein common computer hardware is used for the image recognition apparatus' hardware configuration. The CPU 501, the ROM 502, the RAM 503, the I/F 505, the I/F 506, and the I/F 507 are connected to one another via the bus 508.

In the image recognition apparatus 1, the CPU 501 reads the program from the ROM 502 onto the RAM 503 and executes the program, whereby the above-described units (input circuit 11, setting circuit 12, recognition circuit 13, conversion circuit 14, output circuit 15) are realized on the computer, and the dictionary data and the like stored in the HDD 504 is used to perform the detection process of the image input via the I/F 506. In addition to the CPU 501, the image recognition apparatus 1 may include another computer processor for realized at least one of the above-described units.

Note that the program may be stored in the HDD 504, and may be provided as a file in an installable or executable format, stored in a computer-readable non-transitory storage medium such as a CD-ROM, a CD-R, a DVD or the like or stored in a computer-readable transitory storage medium such as a memory card, a flexible disk (FD) or the like. The program may also be stored in a computer connected to a network such as the Internet, and provided by download via the network. The program may also be provided or distributed via a network such as the Internet.

Figure 8:
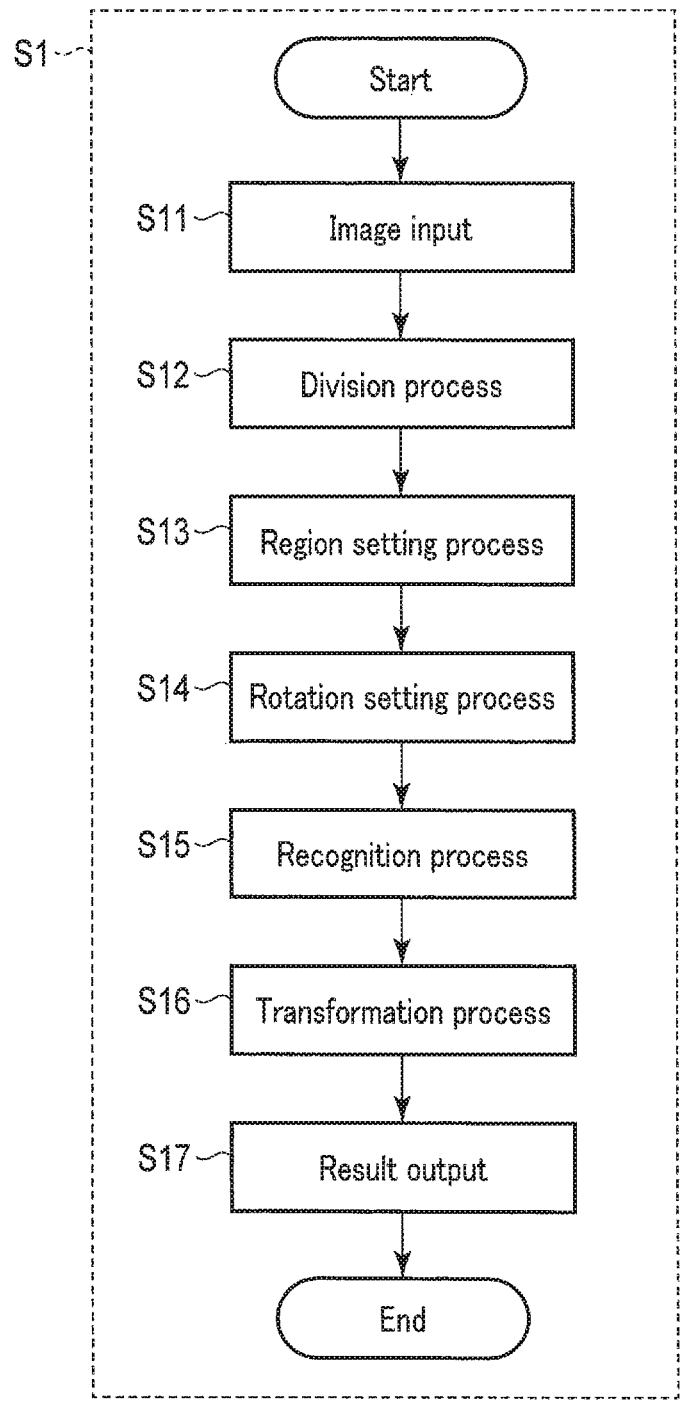
FIG. 8 is a flowchart illustrating the flow of the process performed by the image recognition apparatus.
Figure 9:
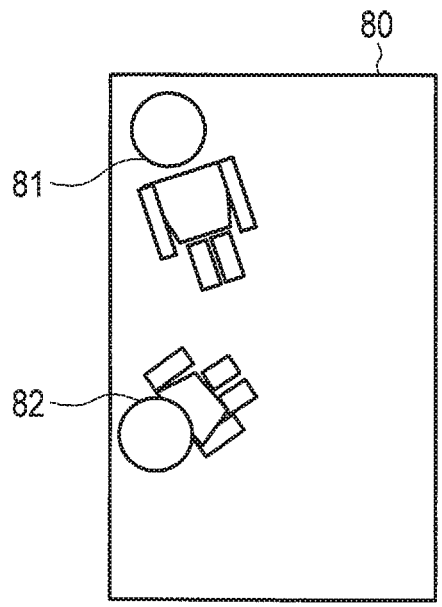
FIG. 9 illustrates an example of an input image.

FIG. 8 is a flowchart illustrating step S1 of the aforementioned process of the image recognition apparatus 1. Here, it will be assumed that an image 80 as shown in FIG. 9 is input to the image recognition apparatus 1. The input image includes a person 81 whose head is up and feet are down, and a person 82 whose feet are up and head is down.

In step S11, an image (here, the image 80 illustrated in FIG. 9) captured by a camera is input via the input circuit 11 of the image recognition apparatus 1 illustrated in, for example, FIG. 1. Then, the process proceeds to step S12.

Figure 10:
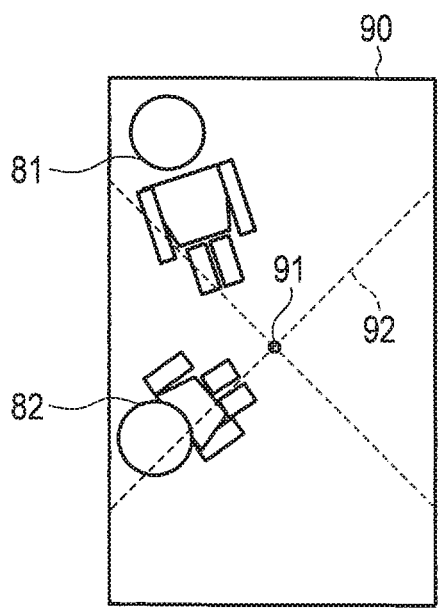
FIG. 10 illustrates an input image divided into four.

In step S12, the setting circuit 12 performs a division process for dividing the image using rays whose starting point is a predetermined positioning point. Then, the process proceeds to step S13. FIG. 10 illustrates how the image is divided into four by boundary lines 92 consisting of rays starting from a point 91 (center of the image 90) at the predetermined position in the image 90.

In step S13, the setting circuit 12 performs, prior to performing the recognition process, a region setting process for configuring a process region. Then, the process proceeds to step S14.

Figure 11A:
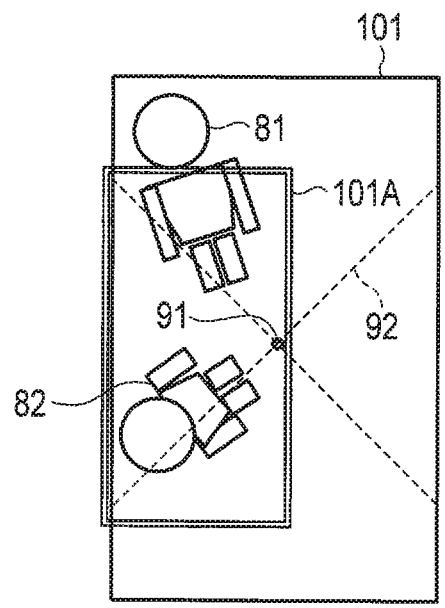
FIG. 11A illustrates how to set a process region for an input image divided into four.
Figure 11B:
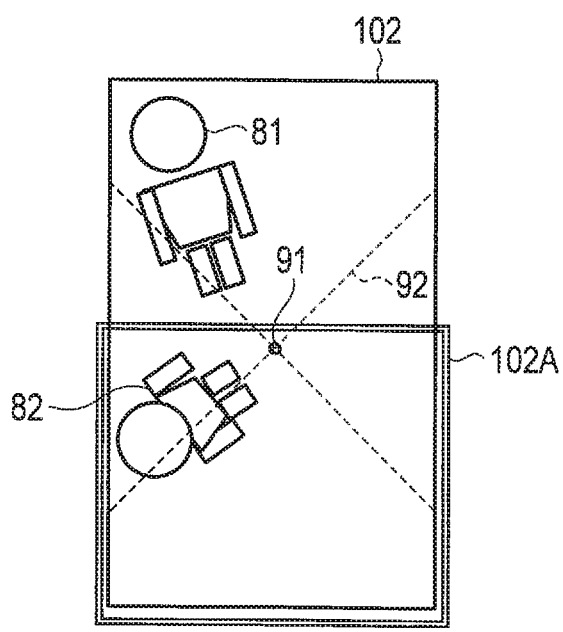
FIG. 11B illustrates how to set a process region for an input image divided into four.
Figure 11C:
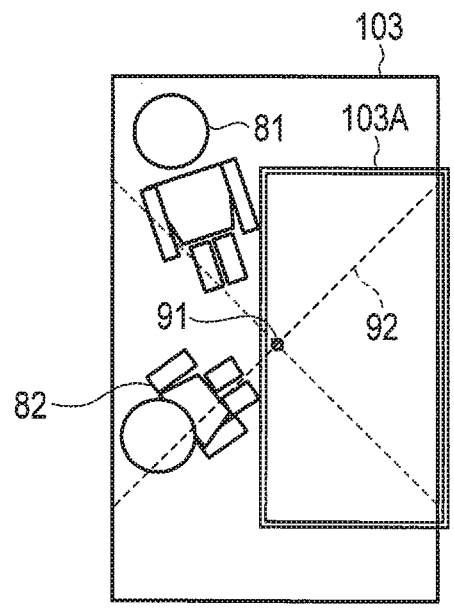
FIG. 11C illustrates how to set a process region for an input image divided into four.
Figure 11D:
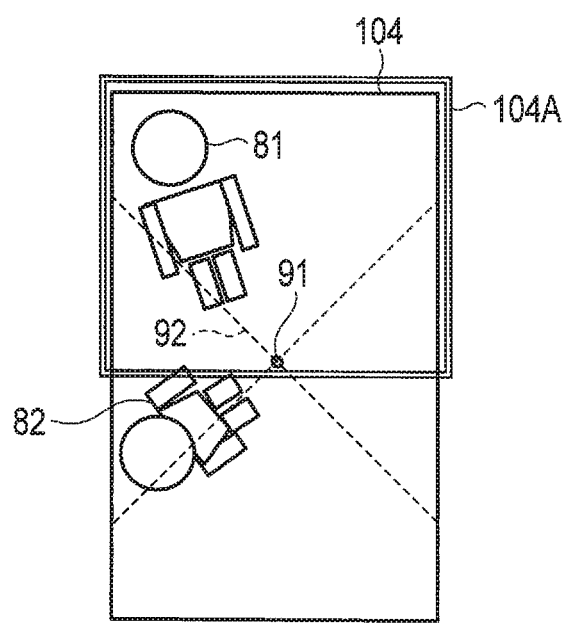
FIG. 11D illustrates how to set a process region for an input image divided into four.

FIGS. 11A-11D illustrate how the process region in the image divided into four is set so that the persons on the rays which are the boundaries are included in the process region. In other words, FIG. 11A illustrates how the persons 81 and 82 in an image 101 divided into four are included in the process region 101A as a result of setting of the process region 101A so that persons on the boundary lines 92 are included; FIG. 11B illustrates how the persons 81 and 82 in an image 102 divided into four are included in the process region 102A as a result of setting of the process region 102A so that persons on the boundary lines 92 are included; and FIG. 11D illustrates how the persons 81 and 82 in an image 104 divided into four are included in the process region 104A as a result of setting of the process region 104A so that persons on the boundary lines 92 are included.

On the other hand, FIG. 11C illustrates how the persons 81 and 82 in an image 103 divided into four are not included in the process region 103A as a result of wetting of the process region 103A so that persons on the boundary lines 92 are included.

In step S14, the setting circuit 12 performs a rotation setting process for configuring the angle of rotation of the respective process region. Then, the process proceeds to step S15. In step S14, rotation is set for each process region so that the person's head is up and the person's feet are down. The angle to be set is such that the rotation by this angle will cause the bisector bisecting the angle between the two boundary lines dividing the image to become vertical.

Figure 12A:
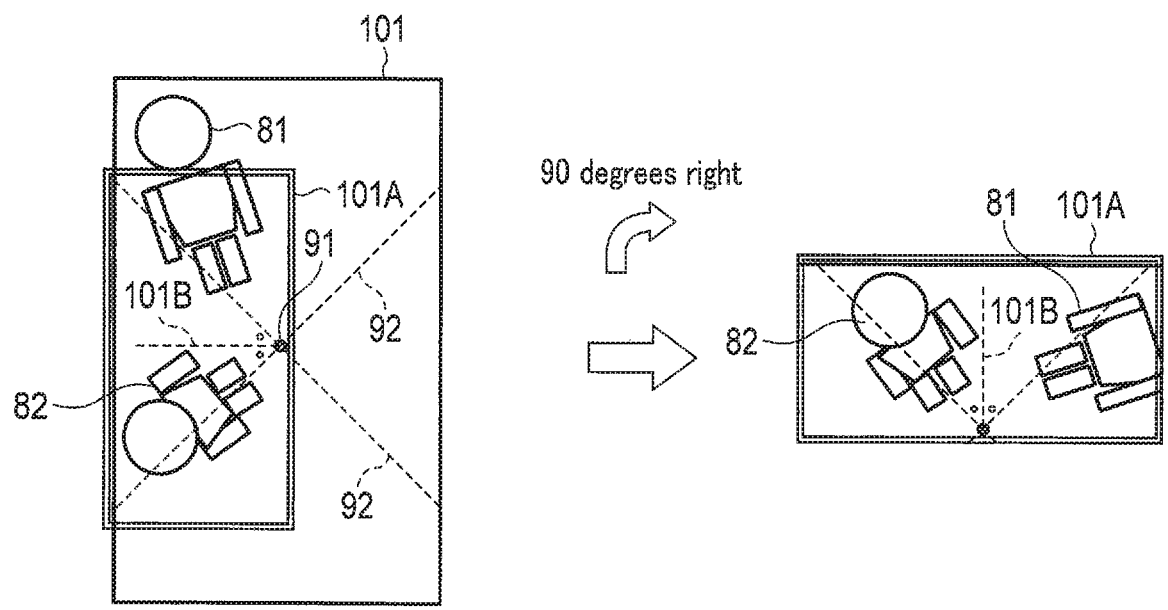
FIG. 12A illustrates how to perform a rotation setting process to a region-set input image.
Figure 12B:
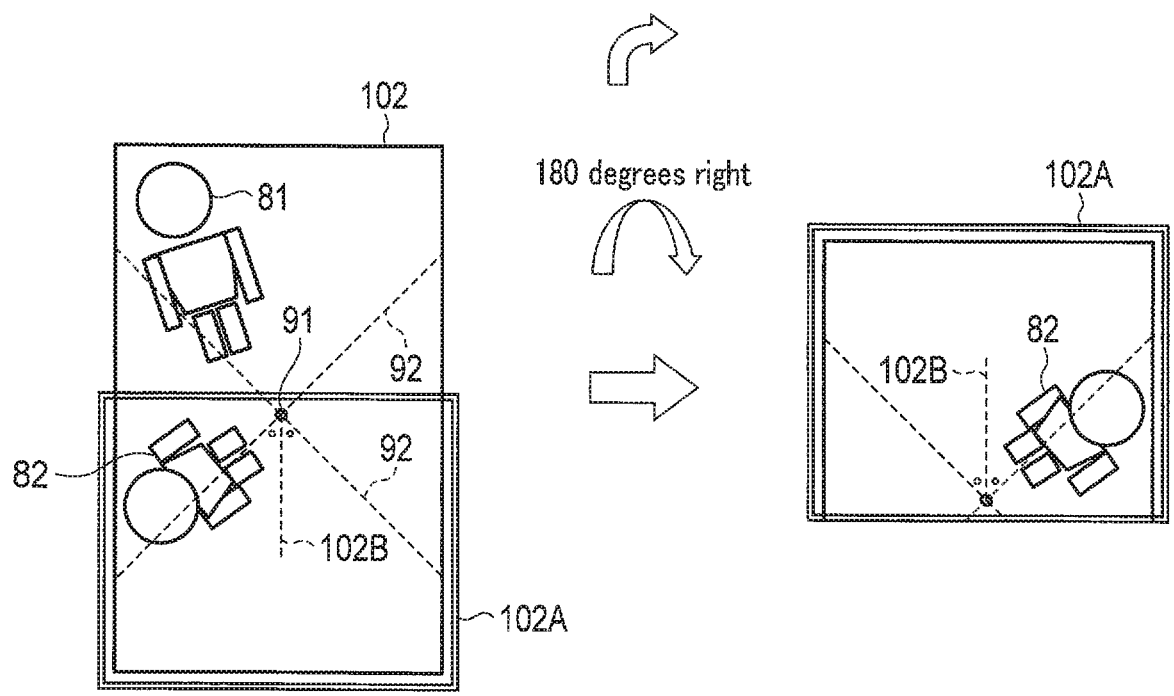
FIG. 12B illustrates how a rotation setting process is performed to a region-set input image.

FIG. 12A illustrates how a rotation setting process of 90 degrees to the right is performed for the process region 101A illustrated in FIG. 11A, while FIG. 12B illustrates how a rotation setting process of 180 degrees to the right is performed for the process region 102A shown in FIG. 11B.

Figure 12C:
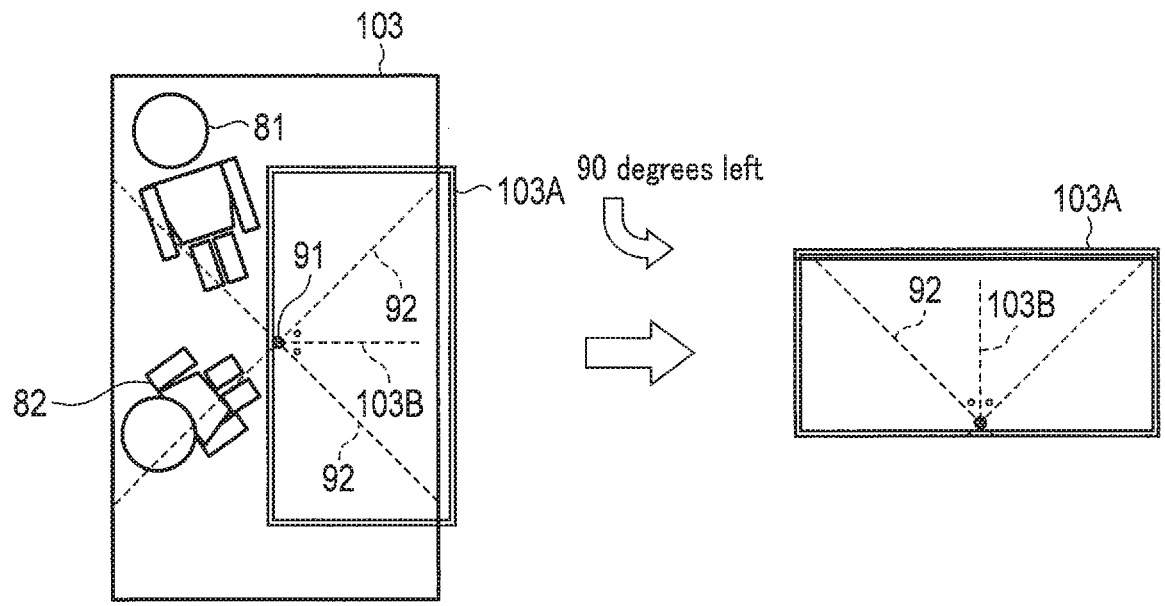
FIG. 12C illustrates how a rotation setting process is performed to a region-set input image.
Figure 12D:
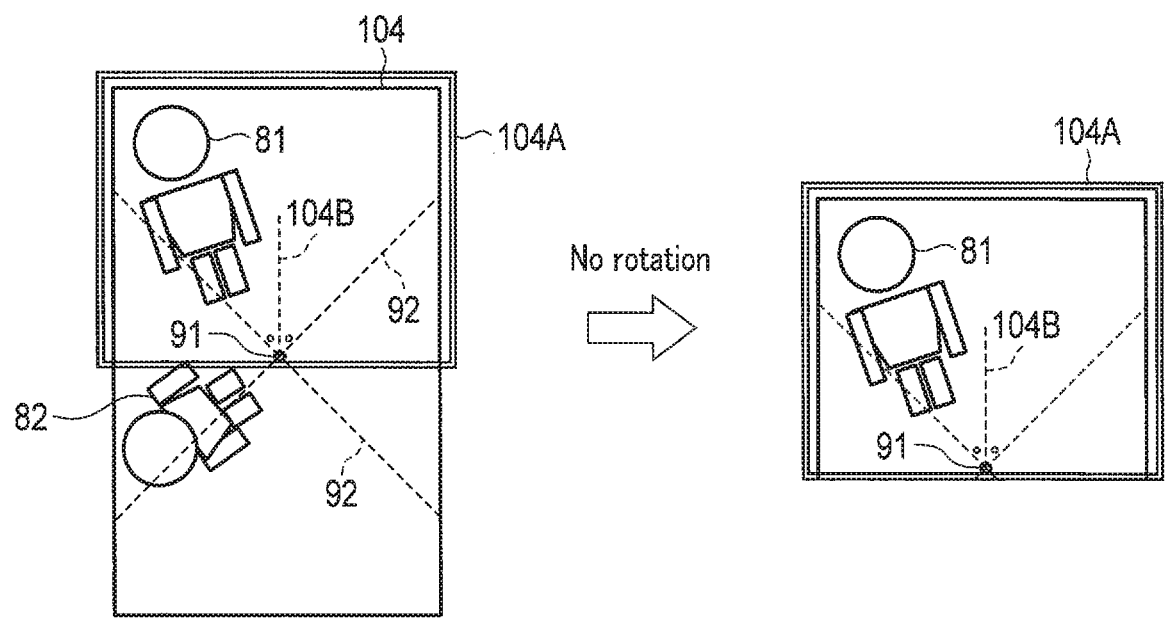
FIG. 12D illustrates how a rotation setting process is performed to a region-set input image.

Similarly, FIG. 12C illustrates how a rotation setting process of 90 degrees to the left is performed to the process region 103A shown in FIG. 11C, and FIG. 12D illustrates how a rotation setting process of 0 degrees is performed to the process region 104A shown in FIG. 11D.

As shown in FIG. 12A, a bisector 101B bisecting the angle between the two boundary lines 92, 92 dividing the image 101 becomes vertical after a rotation of 90 degrees to the right. Similarly, as shown in FIG. 12B, a bisector 102B that bisects the angle between the two boundary lines 92, 92 dividing the image 102 becomes vertical after a rotation by 180 degrees to the right. Similarly, as shown in FIG. 12C, a bisector 103B bisecting the angle between the two boundary lines 92, 92 dividing the image 103 becomes vertical after a 90 degrees rotation to the left.

On the other hand, in the image 104 shown in FIG. 12D, the process region 104A is not rotated since the bisector 104B is vertical at this point. That is, the bisector 104B bisecting the angle between the two boundary lines 92, 92 dividing the image 104 is already vertical.

In this manner, the angles of the bisectors 101B, 102B, 103B, 104B after the rotation match up (all become vertical).

In step S15, the recognition circuit 13 performs rotation of the respective process region by the corresponding angle and performs a recognition process to the same, and sends the result of the process and the setting content such as the angle for the respective process region to the conversion circuit 14. Then, the process proceeds to step S16.

In step S16, the conversion circuit 14 performs, to the recognition result of each process region, a process that includes rotation opposite to the rotation by the angle for the set process region so that the recognition result is converted into a result for the input image, and sends this result to the output circuit 15. Then, the process proceeds to step S17.

In step S17, the recognition result is output.

It has been established above that the image recognition apparatus 1 according to the first embodiment can perform human detection from ceiling camera footage using human detection dictionaries or parameters that learn from conventional images or footage without having to learn anew from the ceiling camera footage. In other words, a person to be recognized can be detected by using preexisting human detection dictionaries or parameters, even if the positional relationship between up and down of the person is different (for example, opposite) from the already recognized relationship of the person.

Second Embodiment

The configuration of an image recognition apparatus 2 according to a second embodiment is characterized by including an additional initial setting circuit allowing the user to set the predetermined positioning point and angle of rotation according to the first embodiment while visually confirming them.

Figure 13:
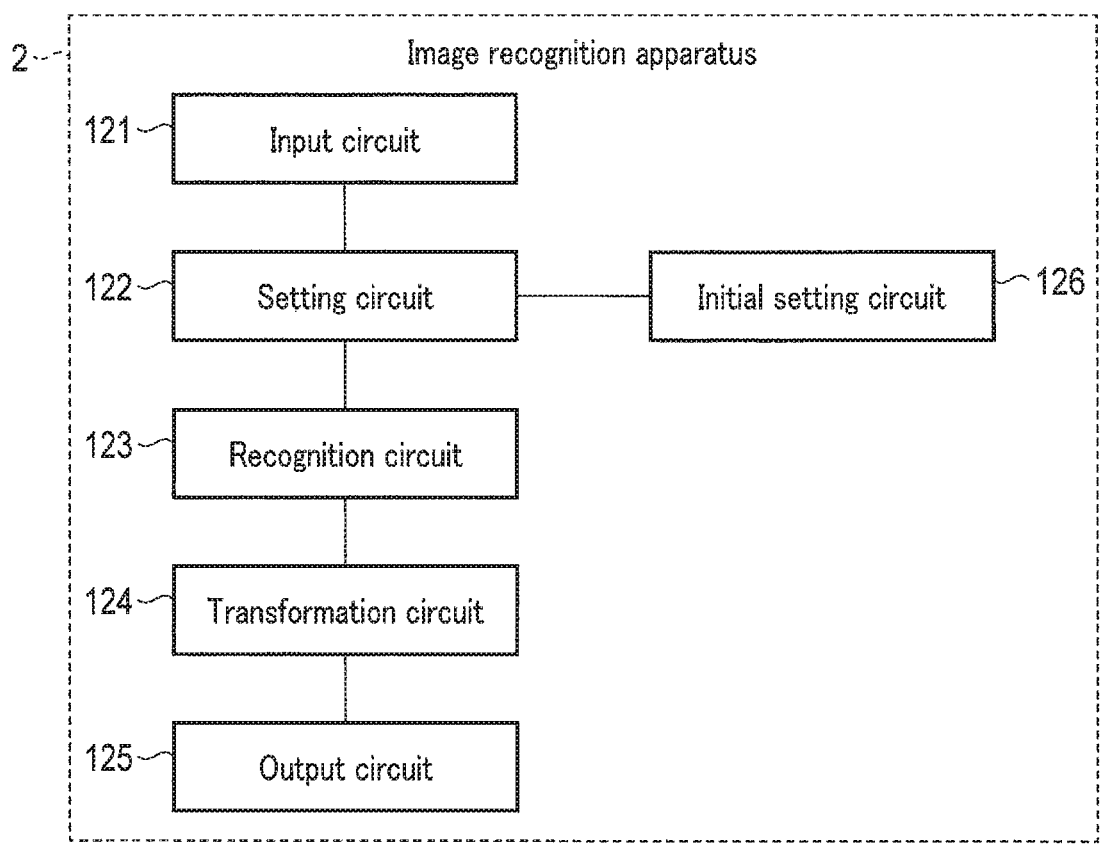
FIG. 13 is a block diagram illustrating the configuration of an image recognition apparatus according to a second embodiment.

FIG. 13 is a block view illustrating the image recognition apparatus 2 according to the present embodiment. The image recognition apparatus 2 includes an input circuit 121, a setting circuit 122, a recognition circuit 123, a conversion circuit 124, an output circuit 125, and an initial setting circuit 126.

The input circuit 121, the setting circuit 122, the recognition circuit 123, the conversion circuit 124, and the output circuit 125 are similar, respectively, to the input circuit 11, the setting circuit 12, the recognition circuit 13, the conversion circuit 14, and the output circuit 15 of the image recognition apparatus 1. Description of these units will therefore be omitted.

The initial setting circuit 126 performs the initial setting process of the predetermined positioning point and angle of rotation while the user visually confirms the same. To set the predetermined positioning point, the initial setting circuit 126 displays the input image allow for visual confirmation of the position where the head of the displayed person hides the feet, and inputs of the position coordinates in the image.

According to another method, the initial setting circuit 126 causes the recognition circuit 123 to cut out and rotate with respect to the temporarily set predetermined positioning point by the angle for each process region, and displays, side by side, the images created by the rotation to the respective process region, and the user can visually confirm whether the person's head in the respective process region is up and the feet are down. If no problem is reported, the initial setting circuit 126 stores the predetermined positioning point set at this time and the angle for the respective process region in the non-volatile memory. If a problem is reported, the initial setting circuit 126 corrects the predetermined positioning point and the angle set for the respective process region, causes the recognition circuit 123 to create the images once more and displays them side by side. The initial setting circuit 126 repeats this until all problems of the setting are resolved, and then stores the attained setting.

It has been established above that the image recognition apparatus 2 of the second embodiment can perform human detection from ceiling camera footage using human detection dictionaries or parameters that learn from conventional images or footage without having to learn anew from the ceiling camera footage, by performing initial setting of the predetermined positioning point and the angle of rotation while the user can visually confirm the same. In other words, a person to be recognized can be detected by using preexisting human detection dictionaries or parameters, even if the positional relationship between up and down of the person is different (for example, opposite) from the already recognized relationship of the person.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An image recognition apparatus comprising:
circuitry configured to:
 input an image of an object captured by a camera;
 divide, based on a predetermined positioning point, an entirety of the image into a plurality of divided regions using rays;
 set a process region that includes an entirety of one of the divided regions and at least a part of another one of the divided regions that is adjacent to the one of the divided regions, so as to fully include the object in the process region when the object is located on a boundary between the one of the divided regions and the another one of the divided regions;
 set a rotation of the process region so that a positional relationship between up and down of the object in the process region matches up; and
 perform the set rotation to a portion of the image corresponding to the process region and perform a recognition process to the portion of the image after the rotation to detect a presence of the object.

2. The apparatus according to claim 1, wherein the circuitry is further configured to:
 perform rotation of a result of the recognition process, the rotation of the result being a rotation opposite to the set rotation, to convert the result of the recognition process into a result of the image that has been input; and
 output the result of the image that has been input.

3. The apparatus according to claim 1, wherein the recognition process comprises a process for detecting a location of the object in the image.

4. The apparatus according to claim 1, wherein the predetermined positioning point is a location in the image where two portions of the object are overlapping.

5. The apparatus according to claim 1, wherein an angle of the set rotation is determined such that an angle of a straight line connecting two portions of the object in the process region falls within a predetermined range.

6. The apparatus according to claim 1, wherein the process region is rectangular.

7. The apparatus according to claim 3, wherein the object comprises a person.

8. The apparatus according to claim 4, wherein the object comprises a person, and the two portions of the object comprise a head and a foot of the person.

9. The apparatus according to claim 1, wherein, in the recognition process, an image is created by rotating the process region.

10. The apparatus according to claim 9, wherein, in the recognition process, images are created by rotating the process region, and the images are connected to create a single image.

11. The apparatus according to claim 9, wherein the circuitry is further configured to, in response to an input of a point in the image, generate images in which the point is set as the predetermined positioning point, and to display the generated images side by side.

12. The apparatus according to claim 1, wherein the circuitry comprises:
 an input circuit to which the image of the object captured by the camera is input;
 a setting circuit configured to divide, based on the predetermined positioning point, the entirety of the image that has been input by the input circuit into the plurality of divided regions using rays, set the process region that comprises the respective one of the divided regions so as to fully include the object on a boundary of the respective one of the divided regions, and set the rotation of the process region so that the positional relationship between up and down of the object in the process region matches up; and
 a recognition circuit configured to perform the set rotation set by the setting circuit to the portion of the image corresponding to the process region and perform the recognition process to the portion of the image after the rotation to detect the presence of the object.

13. The apparatus according to claim 12, wherein the circuitry further comprises:
 a conversion circuit configured to perform rotation of a result of the recognition processing performed by the recognition circuit, the rotation of the result being a rotation opposite to the set rotation set by the setting circuit, to convert the result of the recognition process into a result of the image that has been input; and
 an output circuit configured to output the result converted by the conversion circuit.

14. The apparatus according to claim 1, wherein the circuitry comprises at least one dedicated computer processor configured to:
 input the image of the object captured by the camera;
 divide, based on the predetermined positioning point, the entirety of the image that has been input into the plurality of divided regions using rays;
 set the process region that comprises the respective one of the divided regions so as to fully include the object on a boundary of the respective one of the divided regions;
 set the rotation of the process region so that the positional relationship between up and down of the object in the process region matches up;
 perform the set rotation to the portion of the image corresponding to the process region; and
 perform the recognition process to the portion of the image after the rotation to detect the presence of the object.

15. The apparatus according to claim 14, wherein the at least one dedicated computer processor is further configured to:

perform rotation of a result of the recognition process, the rotation of the result being a rotation opposite to the set rotation, to convert the result of the recognition process into a result of the image that has been input; and output the result of the image that has been input.

16. An image recognition method comprising:

inputting an image of an object captured by a camera;

dividing, based on a predetermined positioning point, an entirety of the image into a plurality of divided regions using rays;

configuring a process region that an entirety of one of the divided regions and at least a part of another one of the divided regions that is adjacent to the one of the divided regions, so as to fully include the object in the process region when the object is located on a boundary between the one of the divided regions and the another one of the divided regions;

configuring a rotation of the process region so that a positional relationship between up and down of the object in the process region matches up;

performing the rotation to a portion of the image corresponding to the process region; and performing a recognition process to the portion of the image after performing the rotation to detect a presence of the object.

17. A non-transitory computer-readable storage medium having an image recognition program stored thereon, the image recognition program being executable to cause a computer to:

input an image of an object captured by a camera;

divide, based on a predetermined positioning point, an entirety of the image into a plurality of divided regions using rays;

set a process region that includes an entirety of one of the divided regions and at least a part of another one of the divided regions that is adjacent to the one of the divided regions, so as to fully include the object in the process region when the object is located on a boundary between the one of the divided regions and the another one of the divided regions;

set a rotation of the process region so that a positional relationship between up and down of the object in the process region matches up;

perform the rotation to a portion of the image corresponding to the process region; and perform a recognition process to the portion of the image after the rotation to detect a presence of the object.

18. The image recognition apparatus according to claim 1, wherein the process region further includes the predetermined positioning point.

* * * * *